UNITED STATES PATENT OFFICE.

JOHN S. WATTLES, OF CANTON, MASSACHUSETTS.

DRESSING COMPOUND FOR THREADS, YARNS, &c.

SPECIFICATION forming part of Letters Patent No. 299,704, dated June 3, 1884.

Application filed March 21, 1884. (No specimens.)

*To all whom it may concern:*

Be it known that I, JOHN S. WATTLES, of Canton, in the county of Norfolk and State of Massachusetts, have invented certain Improvements in Dressing Compounds for Threads, Yarns, &c., of which the following is a specification.

This invention has for its object to provide an improved compound for sizing or dressing thread, yarn, and textile fabrics, whereby a superior body and luster are imparted and the yarn or fabric is prevented from sticking to the heated drying or "slasher" cylinders.

The invention consists in the improved compound which I will now proceed to describe.

In forming a batch of my improved compound I employ the following ingredients, usually in about the proportions hereinafter specified: I first mix in a dry condition in a suitable bin or receptacle about two hundred (200) pounds of starch and twenty-five (25) pounds of flour. I then form a mixture composed of one hundred (100) pounds of any suitable grease or oleaginous material, melted, four (4) gallons of spirits of turpentine, one (1) pound of alum dissolved in water, and about six gallons of hot water. This mixture I pour into the flour and starch mixture while the grease is in a melted condition, and then thoroughly stir the whole until the mixture is in a uniform condition. The compound or mixture is then placed in barrels or other suitable receptacles, and is ready for use. When cold, the compound is of about the consistency of tallow.

I have found by practical experience that the described compound, when applied to threads, yarns, or warps, gives a better body and luster than are afforded by any other compound of which I am aware. The compound penetrates the material to which it is applied, and dries more quickly on the material than any heretofore used, in consequence of the presence of the spirits of turpentine. The compound does not cause the yarns, threads or warps to adhere to each other, nor to the heated slasher-cylinders over which they pass while the compound is drying. The last-named result—viz., the prevention of the dressed material from sticking—is due to the presence of the alum and grease, which neutralize the adhesive properties of the flour and starch.

While the described proportions are such as I have generally adopted, and produce a desirable compound, I do not restrict myself to them, as they may be varied without departing from the spirit of my invention.

Instead of spirits of turpentine, I may use naphtha or other agent which will facilitate the drying of the compound and enable it to penetrate or enter the material readily.

In treating some kinds of thread for use in sewing I have added a small proportion, preferably about ten (10) pounds, of paraffine-wax to the above-named ingredients for the purpose of imparting a harder finish and a higher luster to the thread. Thread thus treated is intended particularly for the under thread of a lock-stitch sewing-machine, it being too hard for the upper thread.

I am aware that a dressing compound composed of starch, acetic acid, and grease has been before used, and I do not therefore claim a compound composed of starch, grease, and an acid. My compound differs from that heretofore used, in that it contains flour, which gives a glazing not afforded by starch alone, spirits of turpentine, which facilitates the drying of the compound after it is applied, and also cuts the grease and thoroughly mixes it with the other ingredients, and alum, which prevents the flour and starch from sticking and does not rust the metal with which it comes in contact.

I claim—

1. The improved dressing compound composed of starch, flour, grease, spirits of turpentine or its equivalent, and alum and water, substantially as set forth.

2. The improved dressing compound composed of starch, flour, grease, spirits of turpentine or its equivalent, alum, water, and paraffine-wax, substantially as set forth.

In testimony whereof I have signed my name to this specification, in the presence of two subscribing witnesses, this 19th day of March, 1884.

JOHN S. WATTLES.

Witnesses:
C. F. BROWN,
A. L. WHITE.